(No Model.)
H. BILGRAM.
METAL PLANER.
No. 289,607. Patented Dec. 4, 1883.
SIDE ELEVATION  Fig. 1.
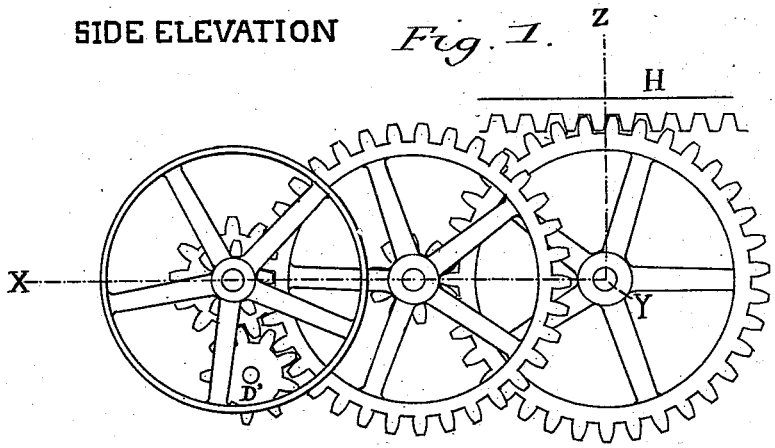
Fig. 2.
SECTION X-Y-Z
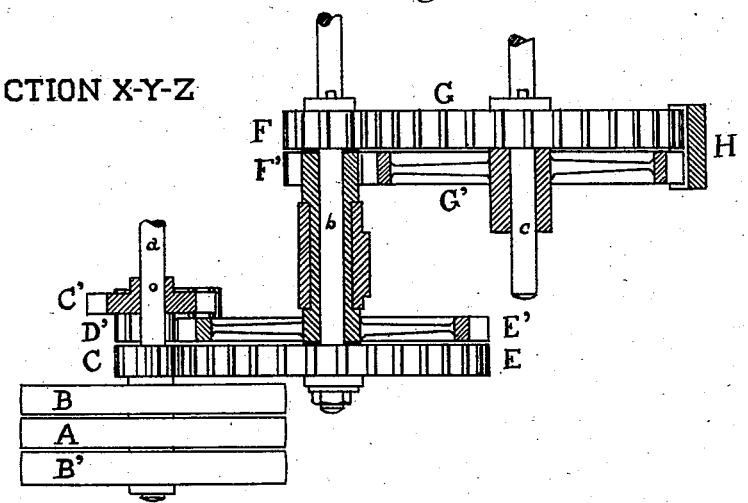
Witnesses,
George L. Pfouts
Fred G. Jahn
Inventor,
Hugo Bilgram

UNITED STATES PATENT OFFICE.

HUGO BILGRAM, OF PHILADELPHIA, PENNSYLVANIA.

METAL-PLANER.

SPECIFICATION forming part of Letters Patent No. 289,607, dated December 4, 1883.

Application filed December 14, 1881. (No model.)

*To all whom it may concern:*

Be it known that I, HUGO BILGRAM, a citizen of the United States, residing in the city and county of Philadelphia, and State of Pennsylvania, have invented a new and useful improvement in planers and all such machines in which a reciprocating motion is transmitted by gear-wheels or their equivalents, of which the following is a specification.

The object of the invention is to obviate the jar occasioned by the backlash of the gears at the instant of reversal of the motion of the reciprocating parts of the machine. It applies exclusively to such mechanisms in which two distinct initial members are brought into alternate connection with the source of motion, and are respectively so connected with the part of the machine requiring the reciprocating motion as to transmit opposite motions to that part. The said object is accomplished by supplying two independent trains of gears to connect the two initial recipients of motion with that part of the machine requiring the reciprocating motion. One application of this principle is shown in the accompanying drawings, representing the gearing of a metal-planer.

Figure I is a side view of the gearing, and Fig. II represents a section on the line X Y Z.

B, A, and B' are three belt-pulleys, of which B' is fixed to the shaft $a$, while the pulley B, together with the pinion C, to which it is united, is free to turn upon the shaft $a$. A is simply a loose pulley. The pinion C engages with a gear, E, fastened to the shaft $b$, which latter carries the pinion F. Upon a third shaft, $c$, is fixed the gear G, engaging with the pinion F and with the rack H, the latter being fastened to the table of the planer. Upon the shaft $a$ is fastened a small gear-wheel, C'. Another gear-wheel, D', gears both into C' and the large wheel E'. By the interposition of this gear-wheel D' the motion which the planer-table receives from the pulley B' will be the reverse of that received from the pulley B, though both pulleys in their turn are run in the same direction by the belt. The gear E' is attached to one end of a sleeve, $e$, carrying at its other end the pinion F'. This sleeve is free to turn upon the shaft $b$, and is supported by the bearing $f$. The pinion F' engages with the wheel G', which gears into the rack H. The gear G is free to turn upon the shaft $c$. The machine is driven by a single belt, that may be shifted from the pulley B to the pulley B', and vice versa, in the usual way, in order to reverse the motion of the table. From this description it will be seen that the two initial recipients of motion—namely, the two pulleys B and B'—are connected with the table by two independent trains of gears. When the belt runs on the pulley B, moving the planer-table in one direction by the train C E F G H, the second train, C' D' E' F' G' H, will be moved by the rack H, whereby the teeth of the latter train are kept in working contact, so that when the belt is shifted from the pulley B to the pulley B' the train is ready for immediate action, there being no lost motion to be taken up. The same conditions prevail when the belt is again shifted to the pulley B, and so on. Either one of the two trains of gears, when moved in one direction, receives its motion from the initial member—the pulley—while when moved in the contrary direction it derives its motion from the terminal member—the rack. For this reason the teeth of the gear-wheels are constantly kept in gearing in the same sense and have never to leave their bearings. On the other hand, if there is only a single train of gears transmitting motion to the table, this train, whether moving in one or the other direction, receives its motion from its initial member. This necessitates a reversal of the contact of the teeth, and a consequent loss of motion, owing to backlash or play between the teeth. This taking up of the backlash is known to be accompanied by a jar, which the herein-described invention purposes to avoid.

The described invention may be executed in various other ways. For instance, in lieu of the odd gear D' of the second train, the reverse motion may be accomplished by open and crossed belts; or the train of gear-wheels may be partially or totally replaced by worm-gearing, bevel-wheels, or other equivalents; or the location of the gears of the two trains may be entirely separate, instead of placing the corresponding gears of both trains on the same shafts; or the belt-pulleys may be replaced by clutches.

Having thus fully described my invention, I claim—

The combination, with metal-planers or other machines in which a reciprocating motion is transmitted by gear-wheels from two belt-pulleys, the latter being brought into alternate connection with the source of motion, of two trains of gears, C E F G H and C' D' E' F' G' H, each connecting one of the pulleys B and B' with the table of the planer, or that part of the machine requiring the reciprocating motion, provided both the said trains of gears are independent of one another, substantially as and for the purpose herein specified.

HUGO BILGRAM.

Witnesses:
WM. C. STEVENSON, Jr.,
GEO. L. PFOUTS.